Dec. 3, 1929.  E. OEHMICHEN  1,738,445
PHOTOGRAPHIC APPARATUS ADAPTED FOR VIEW TAKING
ENLARGEMENTS AND SCREEN PROJECTION
Filed Nov. 16, 1925  2 Sheets-Sheet 1

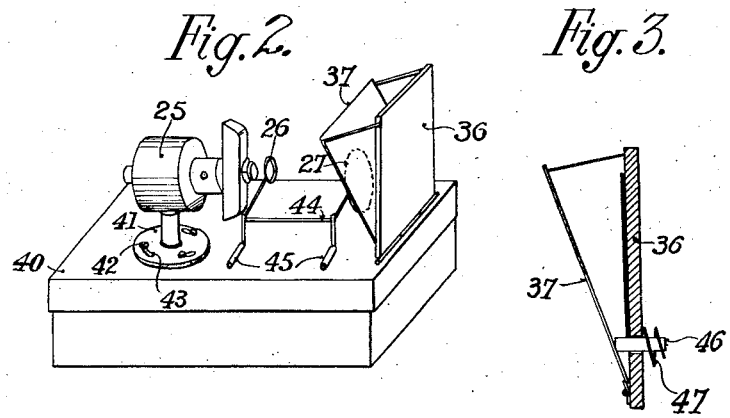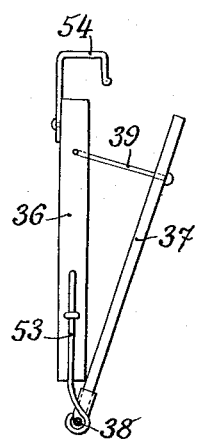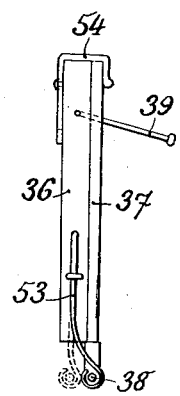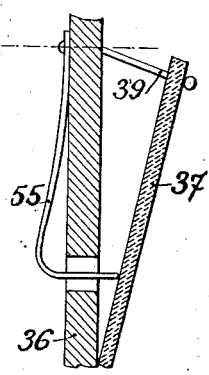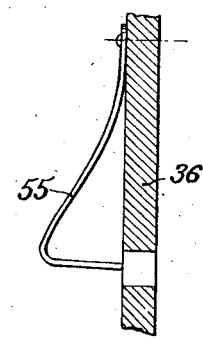

Patented Dec. 3, 1929

1,738,445

UNITED STATES PATENT OFFICE

ETIENNE OEHMICHEN, OF VALENTIGNEY, FRANCE

PHOTOGRAPHIC APPARATUS ADAPTED FOR VIEW-TAKING ENLARGEMENTS AND SCREEN PROJECTION

Application filed November 16, 1925, Serial No. 69,467, and in France April 21, 1925.

The present invention relates to a photographic apparatus which serves at the same time for the taking of views of small size upon films, for the enlargement of said views, and for the screen projection of the positive views.

My said apparatus consists of two distinct parts whereof the first contains the objective, the shutter and the gate for the film, and the second is mounted upon the first by guides or tenons which provide for the instant engagement or removal. The second part contains the mechanism for the winding and unwinding of the film, the film aperture, and a view counter.

The reduced images are formed at frequent intervals upon the film which is wound on a drum of a large diameter such that the additional thickness due to the entire film shall be negligible with reference to the said diameter, or otherwise stated, that one may consider as equal the amount of film wound on the drum for a given angle of rotation whether the first or the last parts of the film are to be considered.

In this manner, I provide a combined apparatus for view taking purposes. For enlargement and screen projection, I employ only the main body containing the objective, and the said body is fitted to an apparatus containing a condenser and an illuminant.

The appended diagrammatic drawings show by way of example an embodiment of the said invention.

Fig. 2 shows a modified form of the apparatus in the operative position.

Fig. 3 shows an arrangement of the enlarging frame.

Figure 1:
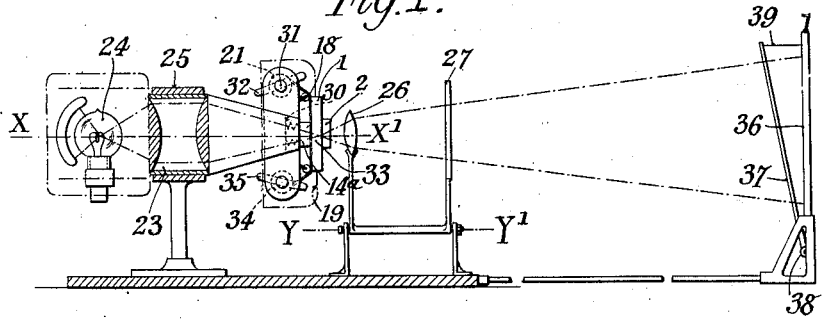
Fig. 1 shows an arrangement for screen projection or enlargement.

Figs. 4 to 7 relate to the enlarging frame.

In Fig. 1 which relates to the arrangement in which 1 is the front part of the apparatus to which is secured an objective 2 fitted with a shutter. This box 1 is placed on the front part of a lantern comprising a condenser 23, a funnel shaped extension to which the said box is attached and a lamp 24, the whole system forming a single unit which is rotatable through 90 degrees upon the optical axis $X X^1$. 25 is a ring which serves to support the said optical system. The said ring is carried by a support 3 secured upon a base 4. In front of the objective 2 is disposed a device comprising a converging lens 26 and a small screen 27 secured thereto; the whole device may be brought, for example, by pivoting about the axis $Y Y'$—into line with the objective or into the position in which the same is left free.

When the device 26—27 is brought before the objective, the converging lens 26 which is suitably calculated will augment the convergence of the projection beam, thus forming on the screen 27 a reduced image, well focused, of the film to be projected, without any change in the adjustment of the main objective. At the same time, the projection on the main screen is cut off, and the operator alone can observe the image and its position.

With this arrangement, the operator can make a preliminary examination of the image, and may select the proper images for projection upon the screen; he may on the other hand, rotate the whole apparatus on the axis $X X^1$ in the proper direction, according as the question relates to views employed according to the height or the width of the said aperture of the apparatus.

The front part of the lantern containing the main body 1 consists of a movable apertured shutter 14$^a$ which is forwardly urged by the springs 30. When the main body 1 is attached to the front part, this will compress the said springs and will oblige the shutter 14$^a$ to bear upon the back part of the passage 19.

The film is engaged in the lantern carrier by means of a suitable device. The end of the film is attached to a notched hub 21 upon which the film is maintained in the wound condition and said hub is disposed upon an axle 31, secured to the main body of the lantern and controlled by a handle 32. The film is then laterally engaged in an aperture 33 surrounded by the attaching shutter 14$^a$, and its end is attached to the drum 34 controlled by the handle 35, after having cleared the rollers 18. By the operation of the key 32 or the key 35, any desired part of the film may be brought into coincidence with the said film aperture. The film is re-wound by operating the handle 32, and the wound film can then be removed and replaced by another.

The board or base on which the lantern support is mounted may be provided with a vertical screen 36 which is mounted thereon by an arrangement of rods of suitable length and position. Upon the screen may be placed the sheet of photographic paper to be used for an enlargement, it being attached thereto by means known such as a glass plate 37 hinged at the bottom at 38 and whose opening movement is limited by connecting means 39. The said sheet is disposed between the screen and the glass plate, the latter being then folded into place and held by any suitable means.

In Fig. 2, it will be observed that in place of installing the enlarging apparatus upon a base, I use for this purpose the box or case 40 serving to contain the photographic apparatus, whereby a saving in cost and a reduction in total weight are obtained. The base 41 of the cylinder 25, carrying the optical system used for enlargement or screen projection, is herein secured to the top of the box by screws or by means of the pins or buttons 42 and the slots 43, so that the base can be removed by a slight rotation; or, like securing means may be employed.

The frame 36 with the swinging glass plate 37 is also removably mounted on the said box, by means of sliding or telescoping devices. The axis of the support 44 holding the screen 27 and the lens 26 is also removably mounted, for instance by rods engaging in sockets 45 secured to the said box.

Fig. 3 shows a device for placing the photographic paper so that it will automatically attain the proper height, and hence no part of the paper will be concealed by the hinge and thus be lost. For this purpose I employ in the frame 36 the bolts 46 which are controlled by the springs 47 in such manner as to bear upon the glass plate 37, the sheet of paper rests upon the spring bolts and the latter will yield to the pressure of the glass plate when raised against the board.

Against the board 36 (Figs. 4 and 5), which is made for instance of wood, are mounted two steel wires 53 ending in loops in which are engaged the ends of the hinge axle 38 for the glass plate; said steel wires are so disposed that the glass can only bear upon the lower part of the board by causing the flexion of said wires. The hinge comprises a flange for preventing the descent of the paper below a given point. I employ the members 39 for limiting the swing of the glass, which consist of flexible pieces or pivoted hooks, which prevent the glass from opening beyond a certain angle, and may be screwed so as to provide for its fastening. The clips 54 are mounted on the board 36 and serve to hold the glass in the closed position when the paper is in place.

To limit the descent of the paper at a suitable point, I may further provide small bolts consisting of steel wires 55 mounted in recesses on the back of the board, (Fig. 7) or simply secured thereto, and passing through suitable holes in the said board; said wires are so disposed that for the maximum opening of the glass plate, the contact between the ends of the wires and the plate will be constantly maintained, and that the wires will automatically disappear when the glass plate is closed up. This action can be annulled by withdrawing the said wire bolts entirely to the back of the board and by placing them to one side, or by otherwise fastening them in a suitable manner. I may use several rows of the said bolts or stop-pieces, in order to accommodate paper of various sizes and to vary its position.

Having thus described my apparatus what I claim as new therein, and my own invention, is:—

1. In an apparatus for the enlarging of photographs, the combination of a screen projection apparatus, a screen mounted in front of said apparatus and adapted to receive a sheet of photographic paper, a converging lens removably placed before the said projection apparatus, a small screen removably disposed between the said lens and the first-mentioned screen, said lens and small screen being adapted to be placed in front of the screen projection apparatus during the centering of the image, and to be removed when the view is projected upon the first-mentioned screen.

2. In an apparatus for the enlarging of photographs, the combination of a screen projection apparatus and a support for the same, said apparatus and its support being adapted for the rotation of said projection apparatus about its optical axis, a screen mounted in front of the said projection apparatus and adapted to receive a sheet of photographic paper, a converging lens removably placed before the said projection apparatus, a small screen removably disposed between the said lens and the first-mentioned screen, said lens and small screen being adapted to be placed in front of the screen projection apparatus during the centering of the image, and to be removed during the screen projection for enlarging purposes.

3. In an apparatus for the enlarging of photographs the combination of a photographic apparatus, a condenser placed at the rear of the said apparatus, a lamp mounted at the rear of the said condenser, a support provided with a tripod and carrying the whole combination of the photographic apparatus, the condenser and the lamp, said combination being rotatable in the said support about its optical axis, a screen placed before the said photographic apparatus and adapted to receive a sheet of photographic paper, a converging lens removably placed in front of the said photographic apparatus, a small screen removably placed between the said lens and the first-mentioned screen, said lens and small screen being adapted to be placed in front of the said photographic apparatus during the centering of the image and to be removed when the image is projected on the screen for enlarging purposes.

4. In an apparatus for the enlarging of photographs, the combination of a photographic apparatus in which a film is wound upon two drums, a condenser placed in the rear of the said photographic apparatus, a lamp placed in the rear of the said condenser, a support provided with a tripod and carrying the whole combination of the photographic apparatus, the condenser and the lamp, said combination being rotatable in the said support about its optical axis, a screen placed before the said photographic apparatus and adapted to receive a sheet of photographic paper, a converging lens removably placed between the photographic apparatus and the first-mentioned screen, a small screen removably disposed before the said lens, said lens and small screen being adapted to be placed in front of the said screen projection apparatus during the centering of the image and to be removed when the image is projected on the screen for enlarging purposes.

5. In an apparatus for the enlarging of photographs, the combination of a screen projection apparatus, a screen placed before said apparatus and adapted to receive a sheet of photographic paper, a converging lens mounted in front of the said projection apparatus, a small screen placed before the said lens, the said lens and small screen being secured to a support pivotally mounted on an axle which is parallel with the optical axis of the said lens.

6. In an apparatus for the enlarging of photographs, the combination of a screen projection apparatus, a screen placed before said apparatus and adapted to receive a sheet of photographic paper, a converging lens placed before the said projection apparatus, a small screen placed between the said lens and the first-mentioned screen, a support upon which the said lens and small screen are pivotally mounted, whereby they may be placed in front of said projection apparatus for the centering of the image and may be removed when the image is projected for enlarging purposes, and a base board on which are mounted the projection apparatus, the said support for the lens and the small screen, and the first-mentioned screen.

7. In an apparatus for the enlarging of photographs, the combination of a screen projection apparatus, a screen placed in front of said apparatus, and adapted to receive a sheet of photographic paper, a converging lens removably placed before the projection apparatus, a small screen removably placed before the said lens, the said lens and small screen being adapted to be placed before the said projection apparatus during the centering of the image and to be removed when the image is projected for enlarging purposes, a base board on which are mounted the projection apparatus, the said lens and small screen, and the first-mentioned screen, this latter being made slidable whereby it may be moved from or towards the small screen.

8. In an apparatus for the enlarging of photographs, the combination of a screen projection apparatus, a screen placed in front of said apparatus and adapted to receive a sheet of photographic paper, a glass plate disposed in the front part of the said screen and hinged to the lower edge thereof, means for limiting the pivotation of said plate, means for holding said plate against the said screen, a converging lens removably placed before the said projection apparatus, a small screen removably placed before the said lens, said lens and small screen being adapted to be placed in front of the said screen projection apparatus during the centering of the image and to be removed when the image is projected on the first-mentioned screen, and a base board upon which are mounted the said projection apparatus, the said lens and small screen, and the first-mentioned screen.

In testimony whereof I have hereunto affixed my signature.

ETIENNE OEHMICHEN.